J. SCHAEFFER.
Grain Cleaning Machine.

No. 27,834.

Patented April 10, 1860.

UNITED STATES PATENT OFFICE.

JACOB SCHAEFFER, OF HENDERSON, KENTUCKY.

GRAIN-SEPARATOR.

Specification of Letters Patent No. 27,834, dated April 10, 1860.

*To all whom it may concern:*

Be it known that I, JACOB SCHAEFFER, of Henderson, in the county of Henderson and State of Kentucky, have invented a new and useful Improvement in Grain-Cleaning Machines; and I do hereby declare that the following is a full, clear, and exact description of the same, reference being had to the accompanying drawings, forming a part of this specification, in which—

Figure 1:
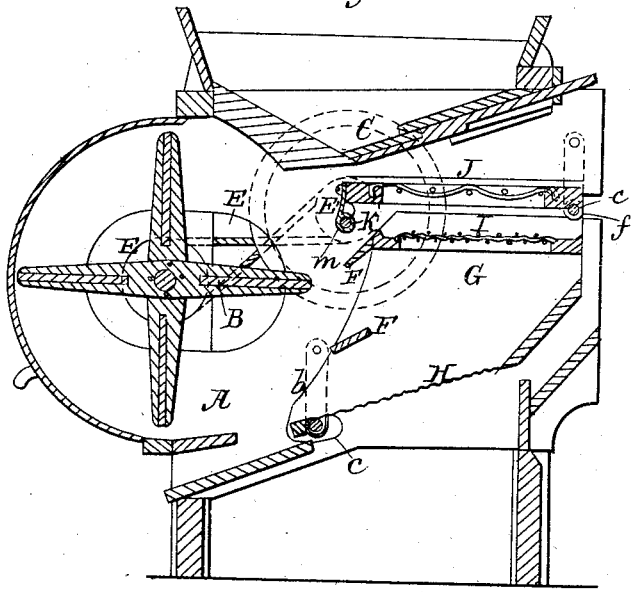
Figure 2:
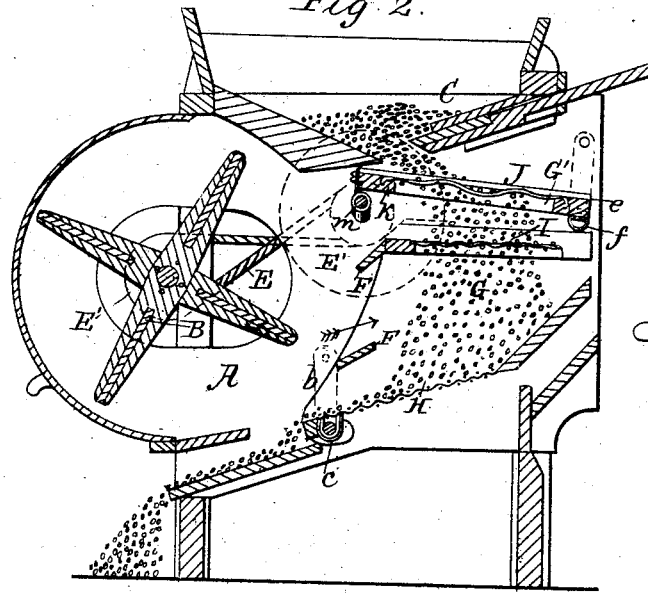
Figure 3:
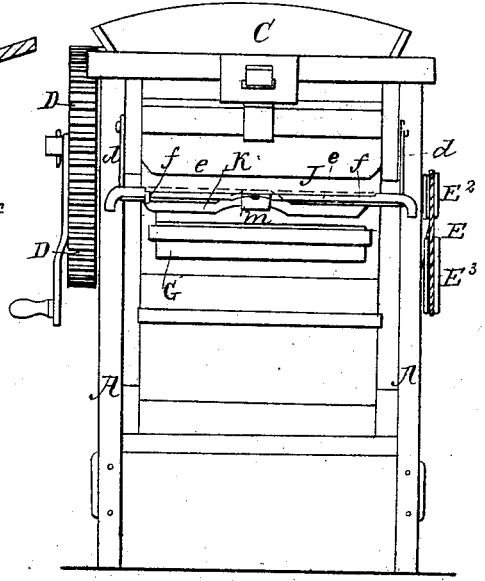

Figure 1, is a vertical longitudinal section of a grain cleaning machine with my improvement applied to it. Fig. 2, is a vertical longitudinal section of the same. Fig. 3, is a front view of the same.

Similar letters of reference, in each of the several figures indicate corresponding parts.

My invention consists in having the rear end of the first chaff riddle attached to a revolving crank shaft and its front end hinged to a suspended swinging frame which contains a second chaff sieve and a grain sieve, all as hereinafter described.

By my arrangement, I obtain with a single crank shaft an independent up and down motion of the first chaff riddle and also a back and forward movement of the same with the second chaff riddle and the grain sieve. It is important to have an independent up and down motion in the first chaff riddle in order that the straw and grain may be pitched up and down at this point with a rapid motion and the blast thus allowed a chance to carry off the chaff. It is important to obtain this motion without being obliged to elevate the frame which contains the second chaff riddle and the grain sieve inasmuch as it avoids much of the complication, inconvenience, loss of power and jarring experienced when all the sieves are elevated and vibrated together.

To enable others, skilled in the art, to make and use my invention, I will proceed to describe its construction and operation.

A, represents the casing of the machine; B, the fan; C, the hopper; D, D, the spur gearing and E, E′, E′, the pulley and band gearing.

F, F, are blades for dividing and properly directing the blast of the fan to the different riddles.

G, is the frame which contains the inclined grain sieve H and the second chaff riddle I, said sieve and riddle being inclined in reverse directions, as shown in the drawing. The frame G, is suspended at its rear bottom end so as to vibrate back and forth by means of swinging brackets $b$, $b$, and a transverse rod $c$, and at its front top end by means of similar brackets $d$, $d$, and rod $e$, as represented.

J, is the first chaff riddle, it of coarser mesh than the second chaff riddle I, and is loosely hinged at its front end to the rod $e$, by staples $f$, $f$, as shown and connected loosely at its rear end by means of an eye strap $m$, to a crank shaft K, as represented, said shaft being connected with the fan or driving shaft by means of the belt and pulley gearing before referred to.

From the above description, it will be seen that as the fan shaft is revolved by the spur gearing, motion will be transmitted through the belt gearing to the crank shaft and said shaft although it revolves in the eye of the strap $m$, it elevates and depresses said strap and thereby causes the first chaff sieve to rapidly rise and fall on its hinge connection, and thereby thoroughly loosen up the grain and chaff and with the aid of the blast at this point accomplish quite a perfect separation of the chaff from the grain. As soon as the chaff sieve has been elevated and begins to descend it moves forward and carries the second chaff riddle and the grain sieve with it and when it has again ascended and begins to descend it draws the second chaff riddle and the grain sieve with it. Thus it will be seen that while a rapid independent up and down movement in the first chaff sieve is obtained, the longitudinally vibrating movement of all the sieves together is not interfered with although only one shaft with a single crank wrist is used.

What I claim as my invention and desire to secure by Letters Patent, is—

Having the rear end of the first chaff riddle attached to a revolving crank shaft K and its front end hinged to a suspended swinging frame which contains a second chaff sieve and a grain sieve, substantially as and for the purposes set forth.

JACOB SCHAEFFER.

Witnesses:
JOHN W. CROCKETT,
THOS. J. JOHNSON.